US011509631B2

(12) United States Patent
Guise, Jr. et al.

(10) Patent No.: US 11,509,631 B2
(45) Date of Patent: Nov. 22, 2022

(54) ONE-ARMED INLINE DECRYPTION/ENCRYPTION PROXY OPERATING IN TRANSPARENT BRIDGE MODE

(71) Applicant: Gigamon Inc., Santa Clara, CA (US)

(72) Inventors: Dale L. Guise, Jr., Indian Harbour Beach, FL (US); David Chun Ying Cheung, Cupertino, CA (US); Fushan Allan Yuan, Sunnyvale, CA (US)

(73) Assignee: Gigamon Inc., Santa Clara, CA (US)

( * ) Notice: Subject to any disclaimer, the term of this patent is extended or adjusted under 35 U.S.C. 154(b) by 206 days.

(21) Appl. No.: 16/895,831

(22) Filed: Jun. 8, 2020

(65) Prior Publication Data
US 2021/0352048 A1 Nov. 11, 2021

Related U.S. Application Data

(60) Provisional application No. 63/022,280, filed on May 8, 2020.

(51) Int. Cl.
*H04L 9/40* (2022.01)
*H04L 9/32* (2006.01)
*H04L 12/46* (2006.01)

(52) U.S. Cl.
CPC ........ *H04L 63/0281* (2013.01); *H04L 9/3236* (2013.01); *H04L 12/4675* (2013.01); *H04L 63/0428* (2013.01); *H04L 63/0485* (2013.01); *H04L 63/123* (2013.01); *H04L 63/20* (2013.01)

(58) Field of Classification Search
CPC .............. H04L 63/0281; H04L 9/3236; H04L 12/4675; H04L 63/0485; H04L 63/20; H04L 63/123; H04L 63/0428
See application file for complete search history.

(56) References Cited

U.S. PATENT DOCUMENTS

| | | | | |
|---|---|---|---|---|
| 10,432,406 B1* | 10/2019 | Amdahl | ................ | H04L 63/205 |
| 2013/0329578 A1* | 12/2013 | Groves | ................. | H04L 43/026 |
| | | | | 370/252 |
| 2014/0122634 A1* | 5/2014 | Conner | ................... | H04L 47/33 |
| | | | | 709/212 |
| 2016/0205071 A1* | 7/2016 | Cooper | ............... | H04L 63/0209 |
| | | | | 726/1 |
| 2017/0310641 A1* | 10/2017 | Jiang | ..................... | H04L 61/103 |
| 2018/0302321 A1* | 10/2018 | Manthiramoorthy | ....................... | |
| | | | | H04L 12/4641 |
| 2019/0124123 A1* | 4/2019 | Higgins | ................ | G06F 21/606 |
| 2020/0186502 A1* | 6/2020 | Suresh | ................ | H04L 63/0471 |

* cited by examiner

*Primary Examiner* — Cheng-Feng Huang
(74) *Attorney, Agent, or Firm* — Perkins Coie LLP

(57) ABSTRACT

A proxy device coupled to a network receives communications between a client and a server on the network. The proxy device operates transparently to the client and the server, while coupled to receive and process the communications from a node on the network via a network port in a one-armed configuration. The proxy device communicates packets of the communications with an external tool coupled to the proxy device via a tool port and operates transparently to the nod and the tool. In certain embodiments, the tool may be a network security device, such as a firewall.

14 Claims, 7 Drawing Sheets

ONE-ARMED INLINE DECRYPTION/ENCRYPTION PROXY OPERATING IN TRANSPARENT BRIDGE MODE

CROSS-REFERENCE TO RELATED APPLICATION

This application claims the benefit of U.S. provisional patent application No. 63/022,280, filed on May 8, 2020, which is incorporated by reference herein in its entirety.

FIELD

At least one embodiment of the present disclosure pertains to computer network technology, and more particularly, to a one-armed inline decryption/encryption proxy that operates in transparent bridge mode.

BACKGROUND

In many network architectures, security devices such as Next Generation Firewalls (NGFW) are connected inline, leveraging a pair of physical network ports, one connected to the "A side", the other connected to the "B side." Traffic to be inspected flows through the device traversing A side to B side, and vice versa. In certain network architectures, including spine-leaf, a security device is connected via a single physical network port, which is commonly referred to as "one-armed mode" or "firewall-on-a-stick." In this case, traffic flows to the device for inspection, and subsequently is returned from the device after inspection over the same physical port and network link. "One-armed" mode or configuration can be defined as a mode or configuration in which an otherwise inline device carries on individual communications over a single, bi-directional connection to the rest of the network, although multiple individual connections (links) each supporting the bi-directional communications may be simultaneously used for redundancy purposes.

One or more proxy devices can be inserted onto a network for the purpose of offloading the task of decryption/encryption of at least some traffic (e.g., SSL/TLS decryption/encryption) from the security device, in order to reduce the processing burden on the security device. For example, traffic communicated between clients and servers may be encrypted using secure sockets layer (SSL)/transport layer security (TLS) (SSL/TLS). Offloading SSL/TLS decryption/encryption from network tools such as NGFW and/or other security devices requires an SSL/TLS Man-in-the-Middle (MiTM) decryption proxy device similarly configured in inline or one-armed mode.

Some existing SSL/TLS MiTM decryption proxy devices can operate in one-armed mode, but to do so they must be configured in layer 3 (L3) mode, such that target traffic must be forwarded to the IP address of the proxy device, and the proxy device performs IP forwarding. Hence, the presence of the proxy is known to other nodes on the network in that scenario. That scenario, therefore, requires significant time and effort to properly configure nodes on the network to communicate with the proxy.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

Figure 1A:
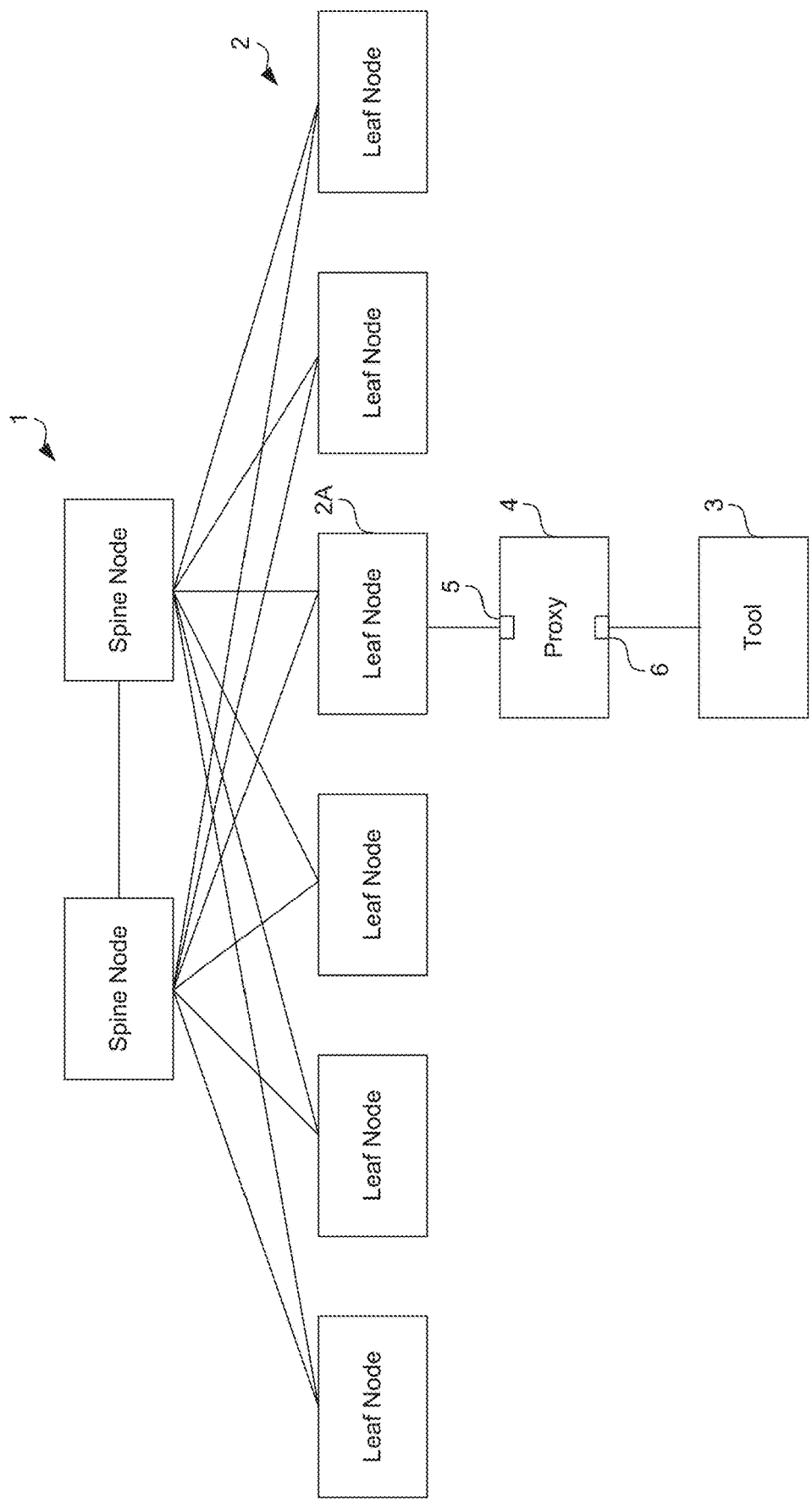
FIG. 1A shows a first example of a spine-leaf topology in which the techniques introduced here can be implemented.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Introduced herein is a solution that implements a one-armed/single-port inline SSL/TLS, MiTM decryption/encryption proxy that operates in transparent bridge ("bump in the wire") mode, physically interconnected between a network service leaf node's network port and a network tool's network port. The solution can provide SSL/TLS decryption/encryption offload transparently for one or more directly attached network tools, such as security devices (e.g., firewalls), that operate in layer 3 mode and perform IP forwarding with inter-VLAN routing. The solution can include the proxy: receiving, from a service leaf node, encrypted packets en route from a client to a server or vice versa, decrypting the packets, sending the decrypted packets to the attached tool for processing, subsequently receiving the packets back from the tool after processing by the tool, re-encrypting the packets, and then forwarding the re-encrypted packets on their way to their intended destination. The solution can load share decrypted payload traffic across multiple attached tool's network ports, and can detect loss of connectivity to an attached tool's network port and redirect decrypted payload traffic to an alternate tool's network port as available.

In this description, for purposes of explanation the proxy device is described as performing decryption/encryption offload on behalf of an attached network tool, such as a firewall. However, in some embodiments the proxy device may perform other types of services in addition to or instead of decryption/encryption. In this description, the proxy device may alternatively be referred to as "the decryption/encryption offload proxy," "the decryption/encryption proxy," "the network proxy," or simply "the proxy." Also, in this description, for purposes of explanation the tool (also called "network tool") is described as being a security tool, such as a firewall. However, in at least some embodiments, a tool such as described herein may provide other functionality in addition to or instead of security/firewall functionality, such as other types of packet analysis for monitoring network performance, etc. Additionally, while the solution introduced here is described in the context of a spine-leaf network topology, it may also be applicable to other network topologies.

At least one embodiment of the solution introduced here includes the following features:

1) A one-armed/single-port inline SSL/TLS MiTM decryption proxy that operates in transparent bridge (bump in the wire) mode, physically interconnected between network service leaf node network port(s) and tool(s) network port(s).

2) The proxy transparently intercepts traffic from a network port of a network service leaf node, that is destined to a network port on a tool.

3) The proxy performs SSL/TLS decryption of the intercepted traffic and steers the decrypted payload traffic to the network port of the tool.

4) The proxy receives processed traffic from the network port of the tool, where the packets of that traffic may have modified VLAN IDs and modified source and/or destination MAC addresses.

5) The proxy re-encrypts the payload from the tool and forwards that traffic back to the network service leaf node.

The proxy described herein remains transparent to all other network nodes, even when the tool makes ISO/OSI layer 2 (L2) changes to the packets (such as modifying the MAC source and destination addresses and/or VLAN IDs, which the tool may do if it implements IP forwarding and/or the traffic is traversing different VLANs/security zones). Note that transparent bridging, such as disclosed herein, generally is not well understood by those involved in L3 communications, such as implemented by conventional MiTM decryption proxies that operate in one-armed mode, which do not operate transparently.

Among other advantages, the proxy introduced here allows "zero-touch" configuration in the network; that is, one can simply insert the proxy into the network, without the other devices on the network being aware of that.

In the absence of a proxy, a client would connect to a server, and the client and server would ordinarily establish a session. When an SSL/ITS proxy device is introduced as described herein, to remain transparent the proxy will emulate the server to the client in a session (session 1) and will emulate the client to the server in a separate session (session 2). SSL/TLS encryption/decryption is stateful and session-specific, so the proxy must keep track of the relationship between these two sessions to correctly and transparently proxy the packets/data belonging to the sessions on both sides and in both directions. In this scenario, the 5-tuple of {IP source address, IP destination address, L4 source port, L4 destination port, IP protocol field} (hereinafter called "the 5-tuple") is not modified by the tool, and therefore can be used along with other information to associate each incoming packet with its correct session. The directionality of each incoming packet (i.e., client-to-server or server-to-client) can be ascertained by the proxy from the Level 2 (L2) information in the packet, such as the source and destination MAC addresses and VLAN ID, since this information will be different for packets travelling in the client-to-server direction than for packets travelling in the server-to-client direction. The proxy can therefore hash the L2 information with the 5-tuple to create a unique session ID for each packet, for example. Alternatively, the L2 information may simply be inspected, without hashing it, and used in conjunction with a hash of the 5-tuple to determine the directionality and session of each incoming packet.

Accordingly, in at least some embodiments the proxy identities and saves the 5-tuple and L2 information (or a hash thereof) of each incoming packet that it receives via either its network port or its tool port. When the proxy receives a packet via its tool port, the proxy compares the 5-tuple and L2 information (or hash thereof) in the packet with its stored 5-tuple/L2 information (or hash thereof) to determine how to forward that packet after re-encryption.

FIG. 1A shows an example of a network configuration in which the technique introduced here can be implemented. The illustrated topology is a spine-leaf topology. A number of leaf nodes 2, also called service nodes or service leaf nodes, are each coupled to a number of spine nodes 1. A number of clients and servers (not shown) are also coupled to various ones of the leaf nodes 2. A network tool 3, such as a firewall or other type of security device, is connected to one of the leaf nodes 2A via a proxy device ("proxy") 4 that, in at least some embodiments, performs SSL/TLS decryption/encryption on behalf of the tool 3, i.e., it performs decryption/encryption offload. The tool 3 is alternatively referred to in this description as a security device or firewall, although it is to be understood that it is not necessarily limited to security or firewall functionality.

In the illustrated embodiment, the proxy 4 and tool 3 are connected to the network in a one-armed configuration. That is, the proxy 4 is connected to a particular leaf node 2A via a single bidirectional physical port (called "network port") 5 and is connected to the tool via another single bidirectional physical port (called "tool port") 6. The proxy 4 decrypts packets that it receives from the leaf node 2A before sending them to the tool 3, and re-encrypts the packets that it receives back from the tool 3 before sending the re-encrypted packets back to the leaf node 2A.

Figure 1B:
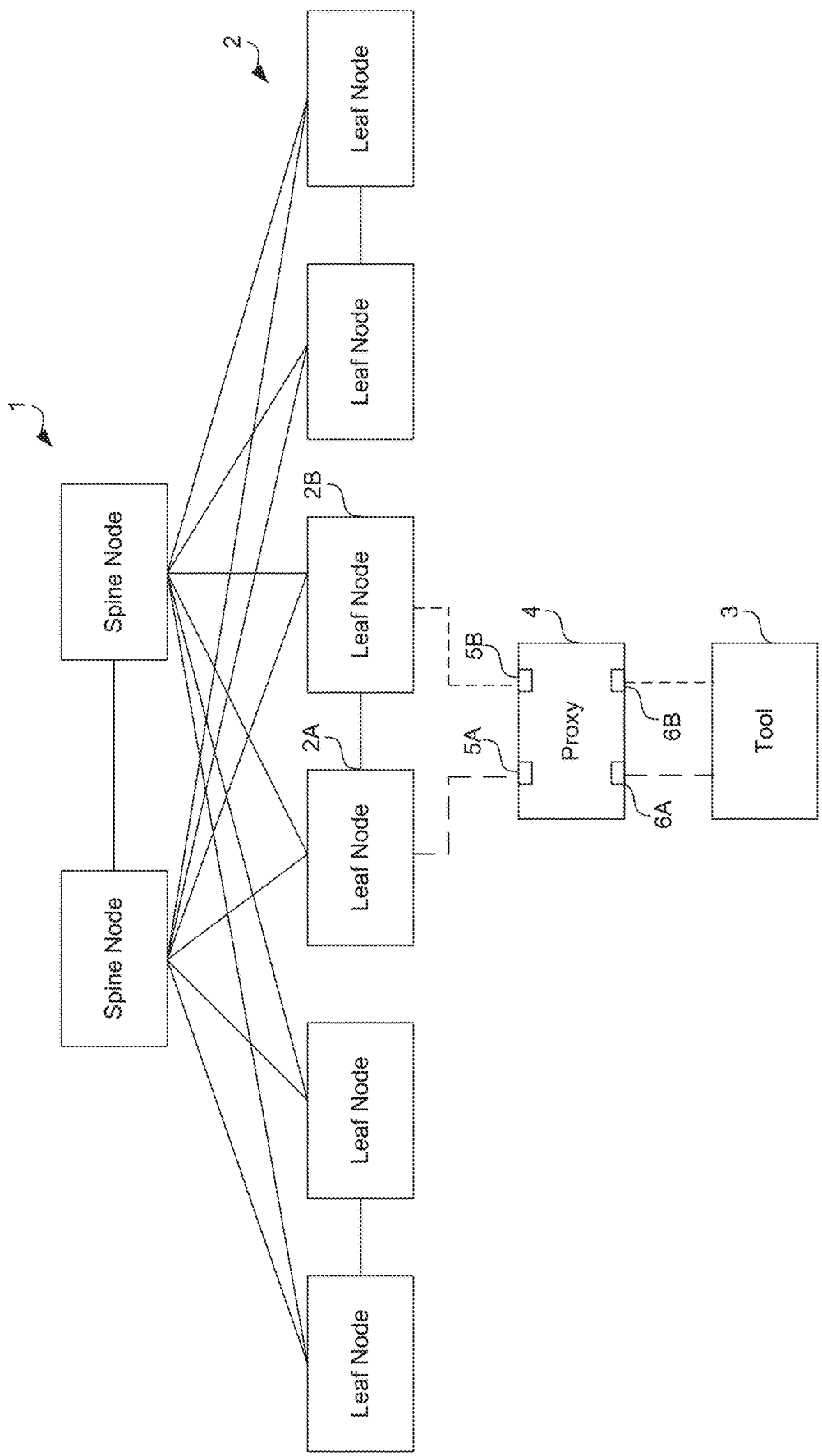
FIG. 1B shows a second example of a spine-leaf topology in which the techniques introduced here can be implemented.

FIG. 11B illustrates a variation upon the topology of FIG. 1A, designed for greater redundancy. In FIG. 1B, each leaf node 2 is connected to one other leaf node in a redundant pair, in addition to being connected to each of the spine nodes 1. The proxy 4 is connected to the tool 3 and to a redundant pair of leaf nodes 2A and 2B in a dual one-armed configuration. That is, the proxy 4 has two network ports 5A and 5B, each of which is connected to one network port on a separate leaf node 2A or 2B, and two tool ports 6A and 6B, each of which is connected to a separate network port on the tool 3. As in the configuration of FIG. 1A, all traffic forwarded by a given leaf node 2 to the proxy 4 passes through the same network port and the same tool port of the proxy 4 in both directions, i.e., on its way to the tool 3 and on its way back from the tool 3. That is, in normal operation, each tool port 6A or 6B of the proxy 4 is paired with a separate one (and only one) of network ports 5A and 5B of the proxy 4. If one of tool ports 6A and 6B fails, then the other one will serve both network ports 5A and 5B. In some embodiments, certain classes of traffic are assigned to one network port/tool port pair and other classes of traffic are assigned to the other network port/tool port pair.

Figure 2:
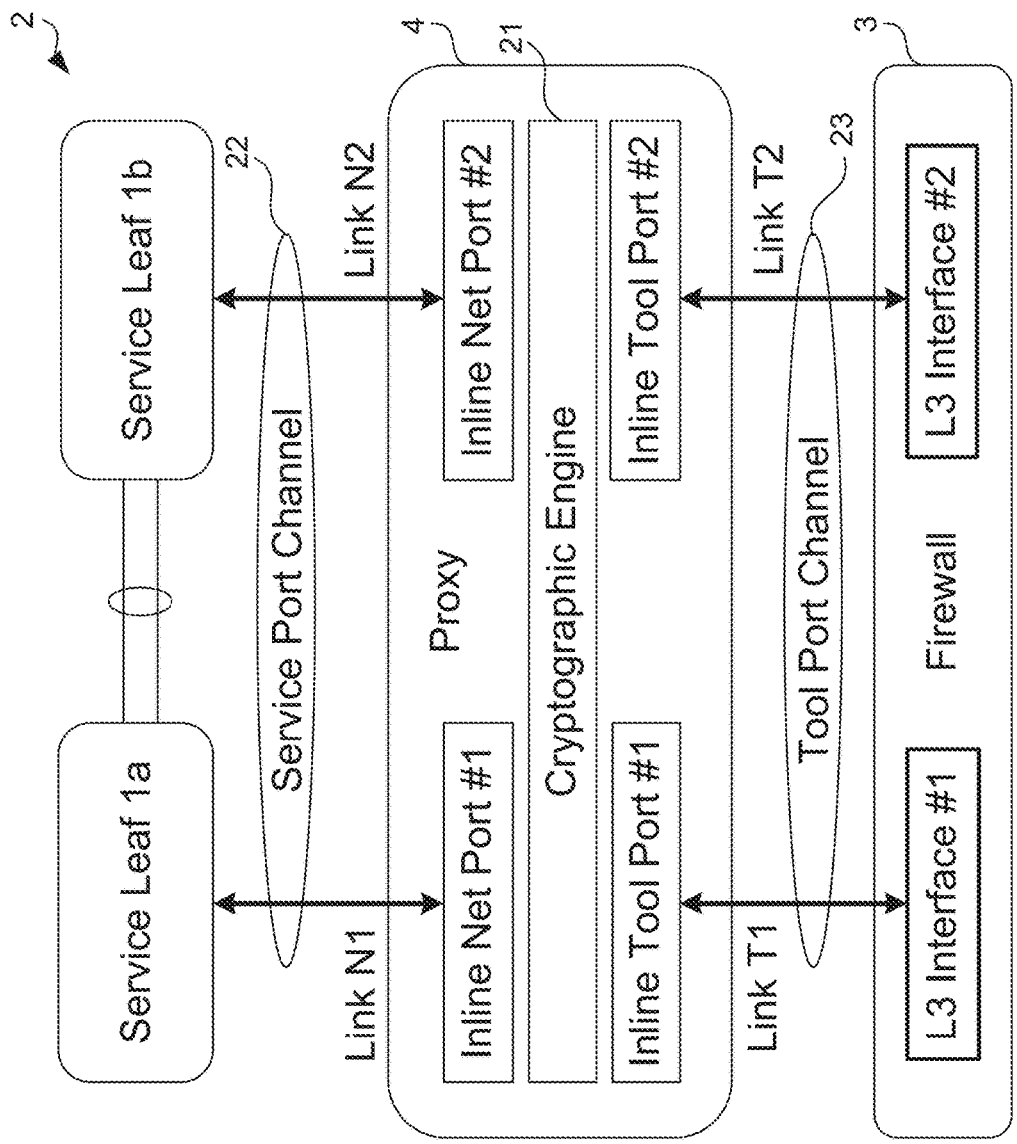
FIG. 2 is a block diagram illustrating features of an operational model of the proxy, according to at least some embodiments associated with the configuration shown in FIG. 1B.

FIG. 2 is a block diagram illustrating features of the proxy 4, according to at least some embodiments associated with the configuration shown in FIG. 1B. More specifically, FIG. 2 shows the proxy 4 according to a single-port inline configuration. The primary function of the proxy 4 in this embodiment is SSL/TLS decryption/encryption. Accordingly, the proxy 4 includes a cryptographic engine 21 to perform decryption and encryption of packets. All traffic paths to and from the proxy 4 are single-port/link bidirectional, not the traditional dual-port/link virtual wire. Links N1 and N2 between service leaves and the proxy 4 form a static "service port channel" 22 for an inline network link aggregation group (LAG). Links T1 and T2 between the firewall 3 and the proxy 4 form a static "tool port channel" 23, which can be part of an inline tool LAG. Processing by the firewall (tool) 3 may change the source and destination MAC addresses and VLAN IDs but preserves the 5-tuple, which means that no address or port translation is done by the firewall on these interfaces. Further, the proxy 4 will not add any VLAN tags or modify packet headers.

The proxy 4 shown in FIG. 2 can be configured to handle various failure modes. For example, during normal operation, traffic can be load balanced across links T1 and T2. In the event of failure of either T1 or T2, the proxy can process traffic to/from the firewall on the remaining available link. In the event of failure of both T1 and T2, upstream action can be taken, based on a configuration setting, to either force disconnection of links N1 and N2, or bypass (loopback) of traffic presented on N1 or N2.

On the service port channel, during normal operation traffic can be load balanced across N1 and N2. In the event of failure of either N1 or N2, the proxy can process traffic to/from the corresponding service node on the remaining available link. In the event of failure of both N1 and N2, there is nothing for the proxy to do.

Figure 3:
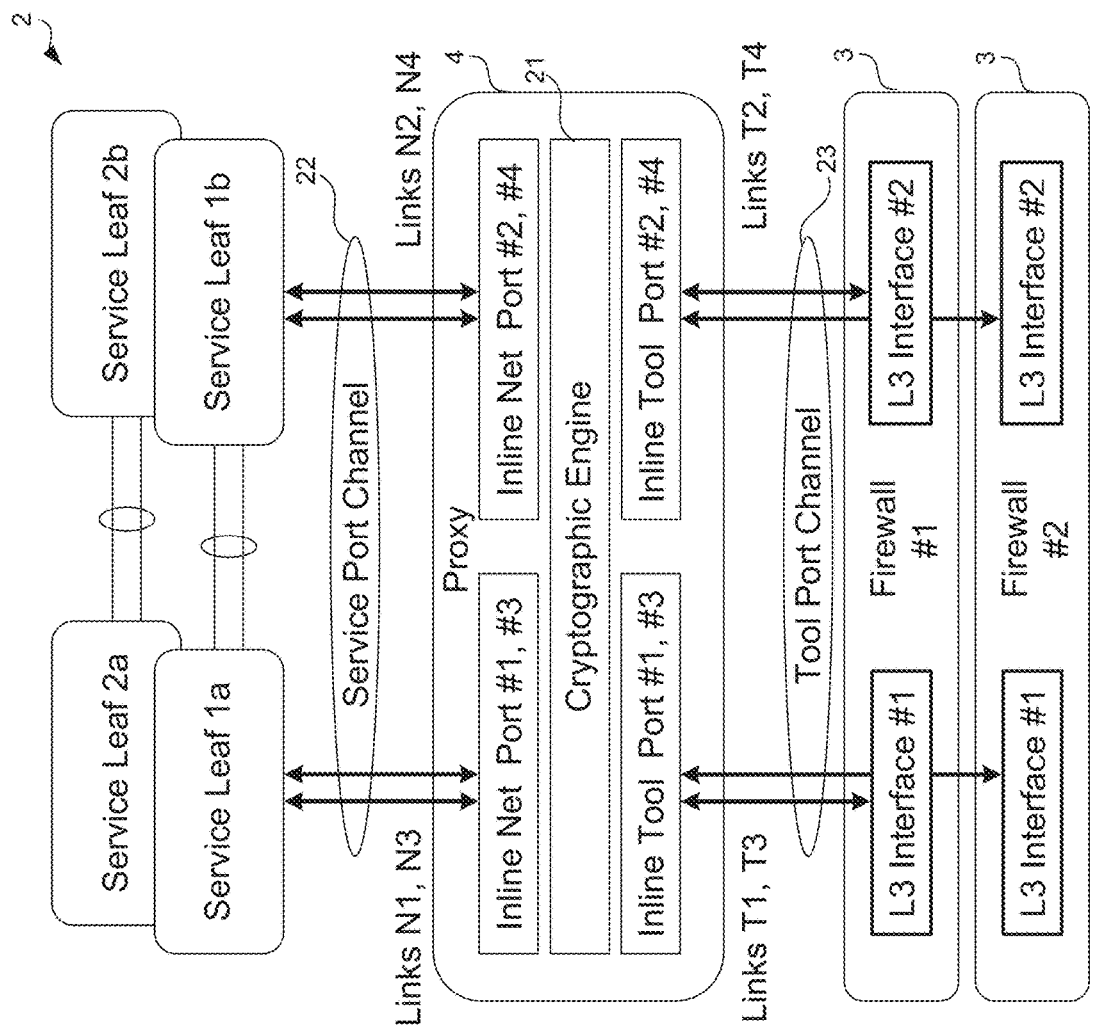
FIG. 3 illustrates how the configuration of FIGS. 1B and 2 can be expanded to allow the proxy to support additional leaf nodes and/or additional firewalls.

FIG. 3 illustrates how the configuration of FIGS. 1B and 2 can be expanded to allow the proxy 4 to support additional leaf nodes 2 and/or additional firewalls 3. Additional ports can be added to the existing service port channel and/or the existing tool port channel and used in the same manner as described above. For either channel, load balancing and failure modes can be extended in similar manner to additional ports. Note also that it is possible to create multiple instances of the proxy function on the same physical appliance.

Figure 4:
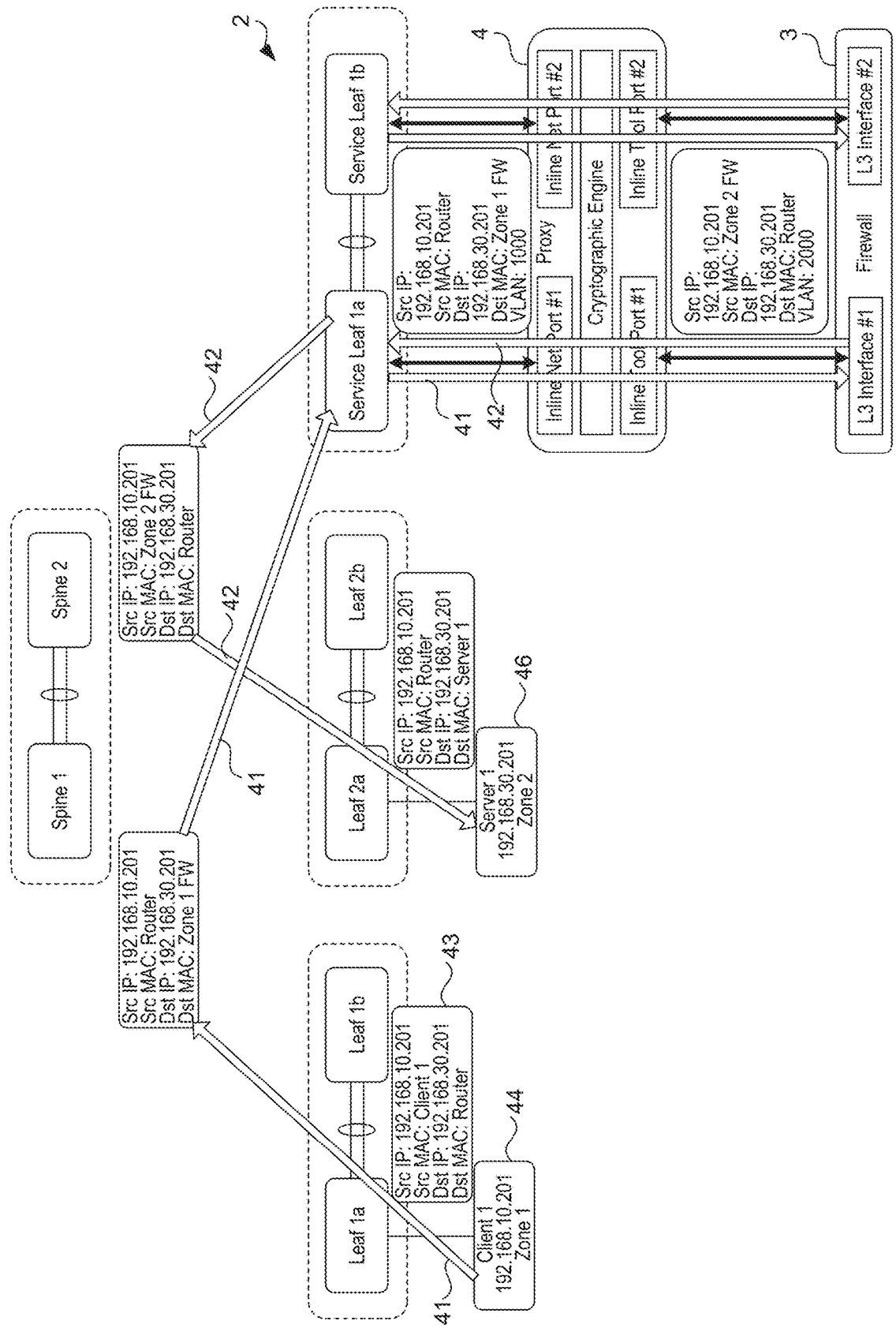
FIG. 4 illustrates an example of dataflow in the topology of FIG. 1B.

FIG. 4 illustrates an example of the data flow in the topology of FIG. 1B (some links between nodes are not shown, to simplify the illustration). Note, however, that the example is also applicable to the topology of FIG. 1A. In this example, a packet 43 originates from a client ("Client 1") 44 and is destined for a server ("Server 1") 46, as can be seen from the source and destination IP addresses of the packet 43. The path taken by packet 43 from Client 1 to Server 1 includes a first portion 41 made up of several hops and a second portion 42 also made up of several, although this fact is not known to Client 1 and Server 1. Various header fields of the packet 43, such as the MAC source and destination addresses, may be altered by the devices that route the packet toward its destination.

The spine nodes may send traffic to Service Leaf 1A or Service Leaf 1B arbitrarily. That leaf node then sends packets to the proxy 4 via its connected link(s). If all links between a given Service Leaf and proxy 4 fail, then that Service Leaf will send packets to its partner Service Leaf to complete the mission.

Upon receiving the packet, the proxy 4 remembers, and at least in some embodiments it creates a hash of: the IP source and destination addresses, L4 source and destination ports, protocol field, source and destination MAC addresses and VLAN ID, of the packet. This header information is saved and subsequently used by the proxy 4 to maintain state for each client-server session, thereby enabling the proxy 4 to forward this packet toward its destination and to route other packets associated with the same client-server session properly, without losing its transparency to the other network nodes. The proxy 4 then decrypts the packet payload and sends a separate copy of the decrypted packet to the firewall 3, via one of its tool ports, for inspection. Assuming the packet passes the firewall's acceptance criteria, the firewall 3 changes the source and destination MAC addresses and VLAN ID of the packet to correspond to a different security zone (e.g., the protected zone versus the unprotected zone) and then sends a separate copy of the packet (with its headers so modified) back to the proxy 4 via each of the tool's redundant network ports and via one of the proxy's tool ports. Here also, to maintain session state, the proxy 4 remembers, and at least in some embodiments it creates a hash of, the IP source and destination addresses, L4 source and destination ports, protocol field, source and destination MAC addresses and VLAN ID of the packet as received from the firewall 3. The proxy 4 then re-encrypts the packet payload and forwards the re-encrypted packet along the second portion 42 of the path to its destination, server 2. In the illustrated embodiment, the proxy 4 sends duplicate copies of the re-encrypted packet back to leaf nodes 1a and 1b, respectively.

Figure 5A:
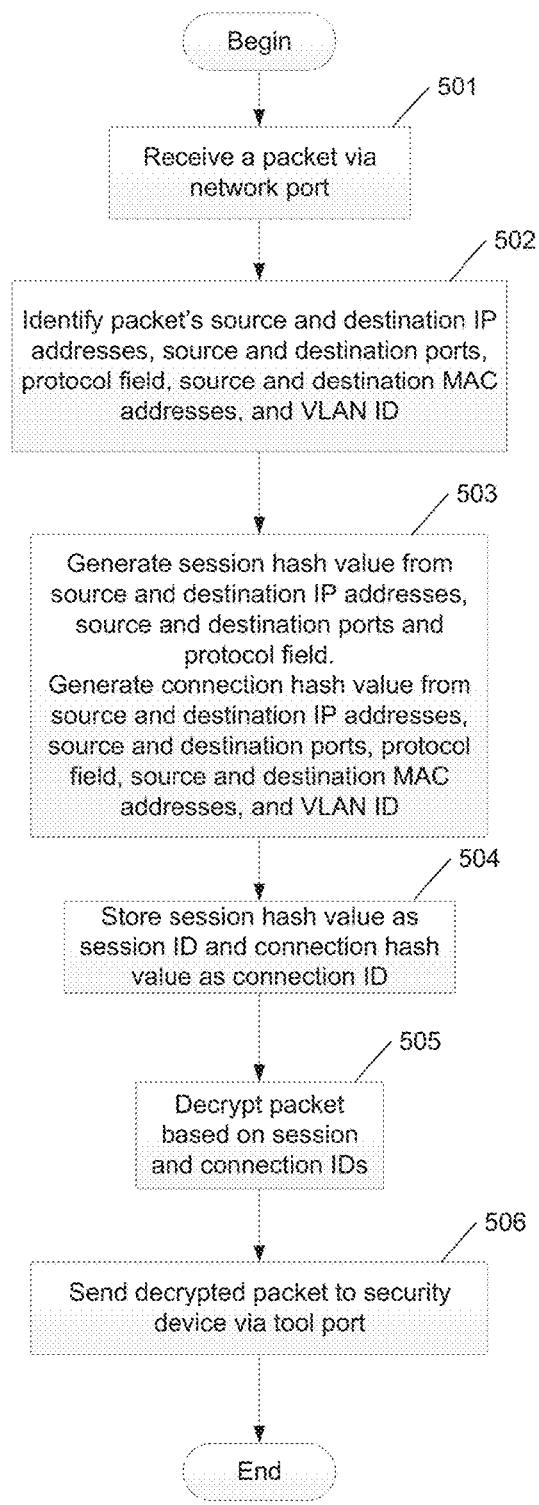
FIG. 5A illustrates an example of a process that can be performed by the proxy to process packets received from a service node.

FIG. 5A illustrates an example of a process that can be performed by the proxy 4 to process packets received from a service node. At step 501 the proxy receives a packet from a service node via a network port of the proxy (the proxy may have one or multiple network ports, as described above). At step 502, from the packet's headers, the proxy identifies the packet's source and destination IP addresses, L4 source and destination ports, protocol field, source and destination MAC addresses, and VLAN ID. Then at step 503 the proxy generates a session hash value from the source and destination IP addresses, L4 source and destination ports, and protocol field. Also at step 503, the proxy generates a connection hash value from the packet's source and destination IP addresses, L4 source and destination ports, protocol field, source and destination MAC addresses, and VLAN ID. Any known or convenient hashing function can be used for this purpose. At step 504 the proxy stores the session hash value as a session ID for the packet's client-server session and stores the connection hash value as the client connection ID. The hash values/session/connection IDs may be stored in any known or convenient type of data structure. At step 505 the proxy decrypts the packet based on its session ID and connection ID. The proxy then sends the decrypted packet to the firewall via its tool port, or if it has multiple tool ports, via the tool port that is paired with the network port mentioned in step 501 above.

Figure 5B:
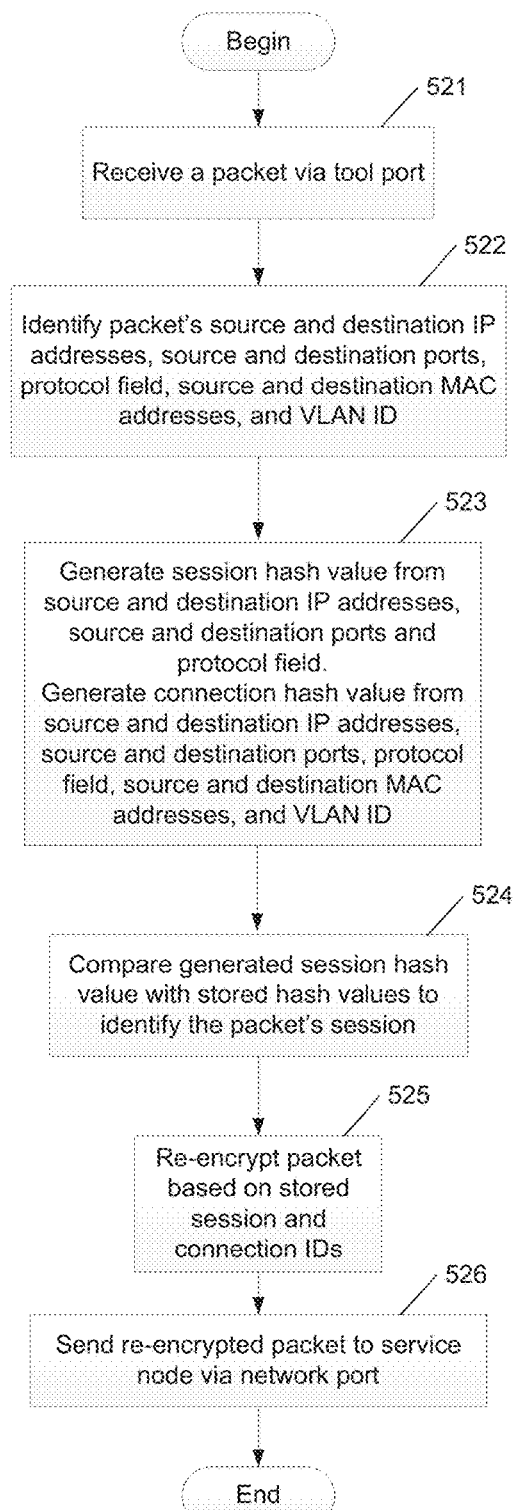
FIG. 5B illustrates an example of a process that can be performed by the proxy to process packets received from the firewall

FIG. 5B illustrates an example of a process that can be performed by the proxy 4 to process packets received from the firewall. At step 521, the proxy receives an unencrypted packet from the firewall via a tool port of the proxy (the proxy may have one or multiple tool ports, as described above), after the packet has been processed by the firewall. In this case, the received packet is a packet that was previously sent (unencrypted) by the proxy to the firewall for processing, or a modified version of such a packet (e.g., with modified L2 headers). At step 522, from the packet's headers, the proxy identifies the packet's source and destination IP addresses, source and destination ports, protocol field, source and destination MAC addresses, and VLAN ID. The proxy then generates a session hash value from the packet's source and destination IP addresses, source and destination ports, and protocol fields at step 523. Also at step 523 the proxy generates a connection hash value from the packet's source and destination IP addresses, L4 source and destination ports, protocol field, source and destination MAC addresses, and VLAN ID at step 523. The same hash function as used in step 503 is used to generate the hash value in step 523. Then, at step 524 the proxy compares the session hash value generated from the incoming packet with its stored session hash values/session IDs to identify the packet's client-server session. The proxy then re-encrypts the packet based on its session ID and connection ID at step 525. At step 526, the proxy sends the re-encrypted packet to the service node from which the proxy originally received the packet, via the network port paired with the tool port from which the proxy received the packet from the firewall.

Figure 6:
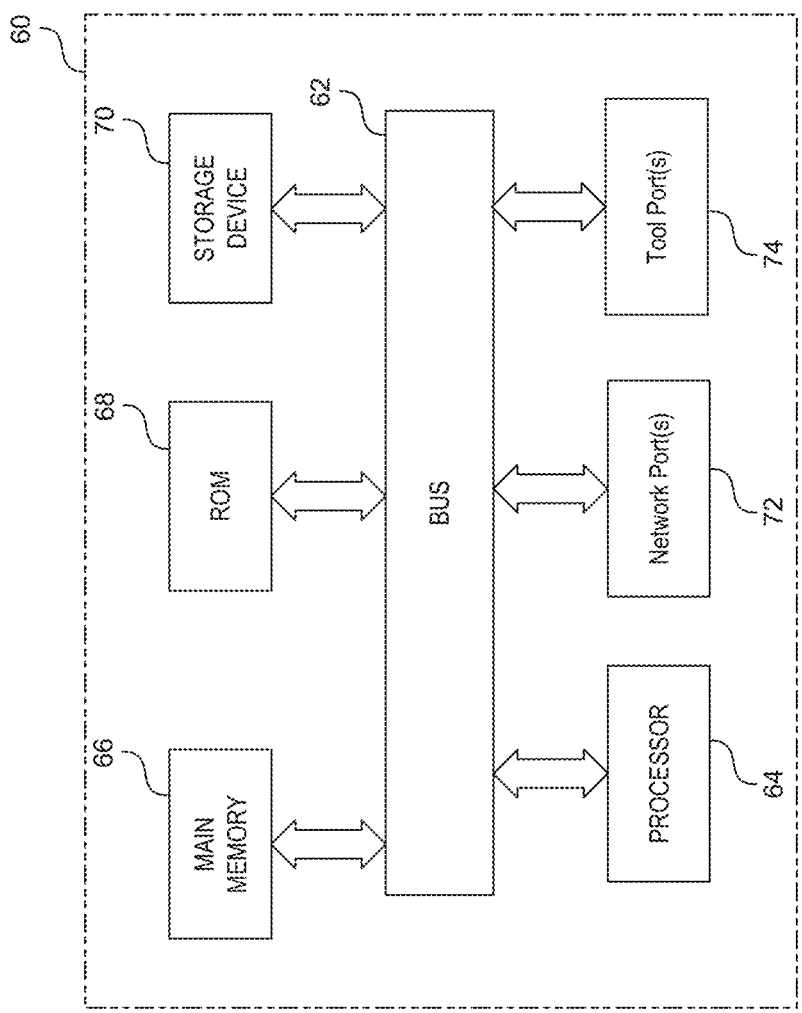
FIG. 6 is a block diagram of a processing system representing an example architecture of the proxy.

FIG. 6 is a block diagram of a processing system 60 representing an example of the significant components of the proxy 4. As shown, processing system 60 includes an interconnect 62 or other communication mechanism for communicating information, and a processor 64 coupled with the interconnect 62 for processing information. The interconnect 62 may be or include, for example, one or more buses, adapters, point-to-point connections, or a combination thereof. The processor 64 may be used to perform various functions described above. For example, in some embodiments the processor 64 may perform or trigger encryption and decryption operations, inspect packet headers, generate, store and compare hash values/session IDs, etc. Processor 64 can be implemented as programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

The system 60 also includes a main memory 66, such as a random access memory (RAM) or other dynamic storage device, coupled to the interconnect 62 for storing information and instructions to be executed by the processor 64. The main memory 66 also may be used for storing temporary variables or other intermediate information during execution of instructions to be executed by the processor 64. The computer system 60 further includes a read only memory (ROM) 68 or other static storage device coupled to the interconnect 62 for storing static information and instructions for the processor 64. A data storage device 70, such as a magnetic, solid-state or optical disk, is provided and coupled to the interconnect 62 for storing information and instructions. The system 60 further includes one or more physical network ports 72 coupled to the interconnect 62, through which the system 60 can communicate with a corresponding one or more service nodes. The system 60 further includes one or more physical tool ports 74 coupled to the interconnect 62, through which the system 60 can communicate with a corresponding one or more tools.

The system 60 may be used for performing various functions described above. According to one embodiment, such use is provided by system 60 in response to processor 64 executing one or more sequences of one or more instructions contained in the main memory 66. Such instructions may be read into the main memory 66 from another computer-readable medium, such as storage device 70. Execution of the sequences of instructions contained in the main memory 66 causes the processor 64 to perform the process steps described herein. One or more processors in a multiprocessing arrangement may also be employed to execute the sequences of instructions contained in the main memory 66. In alternative embodiments, hard-wired circuitry may be used in place of or in combination with software instructions to implement features of the embodiments described herein. Thus, embodiments described herein are not limited to any specific combination of hardware circuitry and software.

Unless contrary to physical possibility, it is envisioned that (i) the methods/steps described herein may be performed in any sequence and/or in any combination, and that (ii) the components of respective embodiments may be combined in any manner.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, tablet computer, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

What is claimed is:

1. A network proxy device comprising:
  a physical network port through which to receive encrypted data traffic being communicated between a client and server on a network, the data traffic to be received at the physical network port in a one-armed mode from a network node other than the client and the server;
  a processor configured to cause decryption, by the network proxy device, of the encrypted data traffic to produce decrypted data traffic; and
  a physical tool port through which to send the decrypted data traffic to a tool that is external to the network proxy device, and through which to receive corresponding decrypted data traffic from the tool after the decrypted data traffic has been processed by the tool, the tool also being external to the network node;
  wherein the processor further is configured to cause corresponding encrypted data traffic to be sent to the network node through said physical network port based on the corresponding decrypted data traffic received from the tool; and
  wherein the network proxy device is operable in a manner that is transparent to the client, the server, the network node and the tool;
  wherein the encrypted data traffic comprises a plurality of encrypted packets; and
  wherein the network proxy device is configured to:
    for each encrypted packet received by the network proxy device through the physical network port,
      prior to sending a corresponding decrypted packet to the tool, identify a tuple that includes a source IP address of the encrypted packet, a destination IP address of the encrypted packet, a source port number of the encrypted packet, a destination port number of the encrypted packet and a protocol field of the encrypted packet,
generate a session hash value based on the tuple,
associate the packet with a particular client-server session based on the tuple, including using the session hash value as a session ID of the particular client-server session,
identify a VLAN ID of the packet and at least one of a source MAC address of the packet or a destination MAC address of the packet,
generate a connection hash value based on the tuple, the VLAN ID of the packet and said at least one of a source MAC address of the packet or a destination MAC address of the packet, and
associate the packet with a client-side connection of the particular client-server session based further on the VLAN ID of the packet and said at least one of a source MAC address of the packet or a destination MAC address of the packet, including using the connection hash value as a connection ID of the client-side connection of the particular client-server session.

2. A network proxy device as recited in claim 1, wherein the tool comprises a network security device.

3. A network proxy device as recited in claim 1, wherein the tool comprises a firewall.

4. A network proxy device as recited in claim 1, wherein the network proxy is operable to remain transparent to the client and the server after the tool modifies a media access control (MAC) address and/or a virtual local area network identifier (VLAN ID) in the decrypted data traffic.

5. A network proxy device as recited in claim 1, wherein the network proxy device is configured to:
generate a second hash value based on the tuple, the VLAN ID of the packet and said at least one of a source MAC address of the packet or a destination MAC address of the packet; and
use the second hash value as a session ID of a server-side connection of the particular client-server session.

6. A network proxy device as recited in claim 1, wherein the network proxy device is configured to communicate with the tool bidirectionally via a single tool port of the network proxy device.

7. A network proxy device comprising:
a physical network port through which to receive encrypted data traffic being communicated between a client and server on a network, the data traffic to be received at the physical network port in a one-armed mode from a network node other than the client and the server;
a processor configured to cause decryption, by the network proxy device, of the encrypted data traffic to produce decrypted data traffic; and
a physical tool port through which to send the decrypted data traffic to a tool that is external to the network proxy device, and through which to receive corresponding decrypted data traffic from the tool after the decrypted data traffic has been processed by the tool, the tool also being external to the network node;
wherein the processor further is configured to cause corresponding encrypted data traffic to be sent to the network node through said physical network port based on the corresponding decrypted data traffic received from the tool; and
wherein the network proxy device is operable in a manner that is transparent to the client, the server, the network node and the tool;
wherein the encrypted data traffic comprises a plurality of encrypted packets; and
wherein the network proxy device is configured to:
for each encrypted packet received by the network proxy device through the physical network port,
prior to sending a corresponding decrypted packet to the tool, identify a tuple that includes a source IP address of the encrypted packet, a destination IP address of the encrypted packet, a source port number of the encrypted packet, a destination port number of the encrypted packet and a protocol field of the encrypted packet,
associate the packet with a particular client-server session based on the tuple,
identify a VLAN ID of the packet and at least one of a source MAC address of the packet or a destination MAC address of the packet, and
associate the packet with a client-side connection of the particular client-server session based further on the VLAN ID of the packet and said at least one of a source MAC address of the packet or a destination MAC address of the packet;
receive a second packet from the tool by the physical tool port;
associate the second packet with the particular client-server session based on a source IP address of the second packet, a destination IP address of the second packet, a source port number of the second packet, a destination port number of the second packet, a protocol field of the second packet; and
associate the second packet with a server-side connection of the particular client-server session based on the VLAN ID of the second packet, and at least one of a source MAC address of the second packet or a destination MAC address of the second packet.

8. A method comprising:
receiving, by a proxy device, communications between a client and a server on a network, wherein the proxy device is coupled to receive the communications from a node on the network other than the client and the server in one-armed mode; and
operating the proxy device transparently to the client, the server and the node, including
processing packets, by the proxy device, of the communications between the client and the server, wherein the encrypted data traffic comprises a plurality of encrypted packets, and wherein said processing packets by the proxy device comprises, for each encrypted packet received by the network proxy device through the physical network port,
prior to sending a corresponding decrypted packet to the tool, identifying a tuple that includes a source IP address of the encrypted packet, a destination IP address of the encrypted packet, a source port number of the encrypted packet, a destination port number of the encrypted packet and a protocol field of the encrypted packet,
generating a session hash value based on the tuple,
associating the packet with a particular client-server session based on the tuple, including using the session hash value as a session ID of the particular client-server session,
identifying a VLAN ID of the packet and at least one of a source MAC address of the packet or a destination MAC address of the packet,
generating a connection hash value based on the tuple, the VLAN ID of the packet and said at least one of a source MAC address of the packet or a destination MAC address of the packet, and associating the packet with a client-side connection of the particular client-server session based further on the VLAN ID of the packet and said at least one of a source MAC address of the packet or a destination MAC address of the packet, including using the connection hash value as a connection ID of the client-side connection of the particular client-server session; and communicating, between the proxy device and an external tool coupled to the proxy device, processed packets of said communications between the client and the server, in one-armed mode, wherein operation of the proxy device also is transparent to the tool.

9. A method as recited in claim 8, wherein the tool comprises a network security device.

10. A method as recited in claim 8, wherein the tool comprises a firewall.

11. A method as recited in claim 8, wherein:
said processing packets by the proxy device comprises performing, by the proxy device, decryption and encryption of packets of the communications between the client and the server; and
said communicating processed packets comprises communicating decrypted packets between the proxy device and the tool.

12. A method as recited in claim 8, wherein said communicating processed packets comprises communicating processed packets between the proxy device and the tool bidirectionally via a single tool port of the proxy device.

13. A method as recited in claim 8, wherein the proxy remains transparent to the client, the server, the network node and tool after the tool modifies a MAC address and/or a VLAN ID of data packets being communicated between the client and the server.

14. A method comprising:
receiving, by a proxy device, communications between a client and a server on a network, wherein the proxy device is coupled to receive the communications from a node on the network other than the client and the server in one-armed mode; and
operating the proxy device transparently to the client, the server and the node, including
processing packets, by the proxy device, of the communications between the client and the server, wherein the encrypted data traffic comprises a plurality of encrypted packets, and wherein said processing packets by the proxy device comprises, for each encrypted packet received by the network proxy device through the physical network port,
prior to sending a corresponding decrypted packet to the tool, identifying a tuple that includes a source IP address of the encrypted packet, a destination IP address of the encrypted packet, a source port number of the encrypted packet, a destination port number of the encrypted packet and a protocol field of the encrypted packet,
associating the packet with a particular client-server session based on the tuple,
identifying a VLAN ID of the packet and at least one of a source MAC address of the packet or a destination MAC address of the packet, and
associating the packet with a client-side connection of the particular client-server session based further on the VLAN ID of the packet and said at least one of a source MAC address of the packet or a destination MAC address of the packet;
receiving a second packet from the tool by the physical tool port;
associating the second packet with the particular client-server session based on a source IP address of the second packet, a destination IP address of the second packet, a source port number of the second packet, a destination port number of the second packet, a protocol field of the second packet; and
associating the second packet with a server-side connection of the particular client-server session based on the VLAN ID of the second packet, and at least one of a source MAC address of the second packet or a destination MAC address of the second packet.

* * * * *